Figure 1:
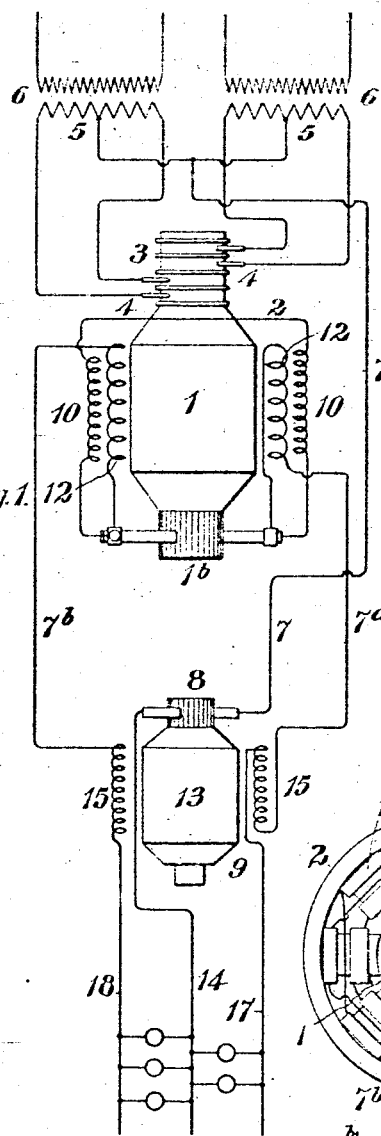

No. 660,320. Patented Oct. 23, 1900.
C. I. YOUNG.
SYSTEM OF ELECTRICAL DISTRIBUTION.
(Application filed Mar. 6, 1900.)
(No Model.)

WITNESSES:
C. L. Belcher
W. Sumner Seibert

INVENTOR
Charles I. Young
BY Wesley G. Carr
ATTORNEY.

UNITED STATES PATENT OFFICE.

CHARLES IRA YOUNG, OF PHILADELPHIA, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 660,320, dated October 23, 1900.

Application filed March 6, 1900. Serial No. 7,587. (No model.)

*To all whom it may concern:*

Be it known that I, CHARLES IRA YOUNG, a citizen of the United States of America, residing at Philadelphia, in the county of Philadelphia and State of Pennsylvania, have invented a new and useful Improvement in Systems of Electrical Distribution, (Case No. 867,) of which the following is a specification.

My invention relates to systems of electrical distribution, and particularly to those known as "three-wire" systems, in which a positive, a negative, and a neutral or balancing conductor are employed, the translating devices being connected between the neutral or balancing conductor and each of the main conductors of the system and the arrangement being such that the energy for operating the translating devices flows entirely through the main conductors of the system when the two sides are equally loaded, but partially through the balancing-conductor in the one or the other direction when the two sides are unequally loaded.

The object of my invention is to provide a three-wire system of distribution supplied by either a single dynamo-electric machine or a plurality of such machines connected in multiple with a regulating means which shall serve to automatically adjust the voltage of either side of the circuit in accordance with the condition of such circuit as regards the load thereon.

In the use of three-wire systems of distribution of the well-known Edison type supplied by two compound-wound machines connected in series and having the neutral or balancing conductor connected between the two machines the voltage of the system will be automatically adjusted in accordance with variations in load on either the positive or negative side, or on both, the regulation of the two sides of the system being substantially independent of each other. In the case of three-wire systems that are supplied by a single rotary converter or by a plurality of such converters connected in parallel and in which the neutral or balancing conductor of the system is connected to the middle point of the transformer which supplies the rotary converter with alternating currents in the manner set forth in Patent No. 607,621, granted to Benjamin G. Lamme July 19, 1898, the raising or the lowering of the potential on either side of the system will correspondingly affect that of the other unless some auxiliary means for regulating or adjusting the potential is employed. The same is true with reference to three-wire systems of distribution supplied from a single generator which is provided with alternating-current connections to a transformer-winding having its middle point connected to the balancing-conductor of the system, as is set forth in Patent No. 513,006, granted to Michael Dolivo-Dobrowlsky January 16, 1894.

In order to automatically adjust the voltage on either side of a three-wire circuit supplied by either of the means above indicated in accordance with variations in load and without affecting the other side of the circuit, I have devised the means shown in the accompanying drawings, in which—

Figure 2:
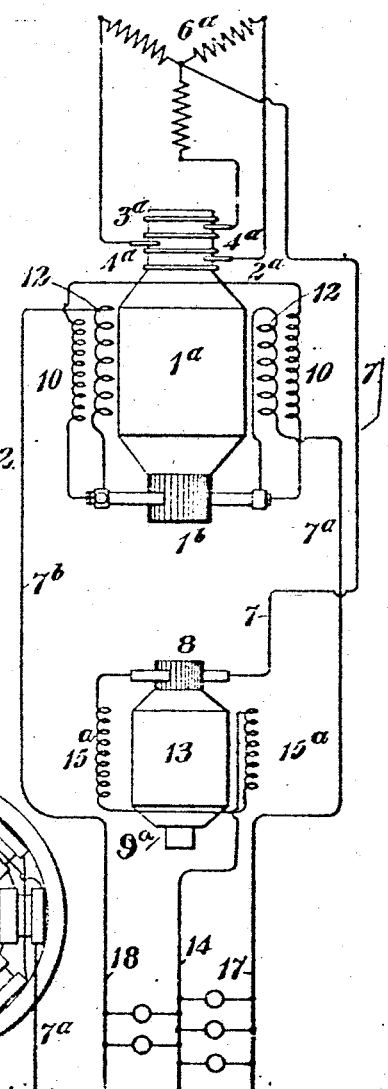
Figure 3:
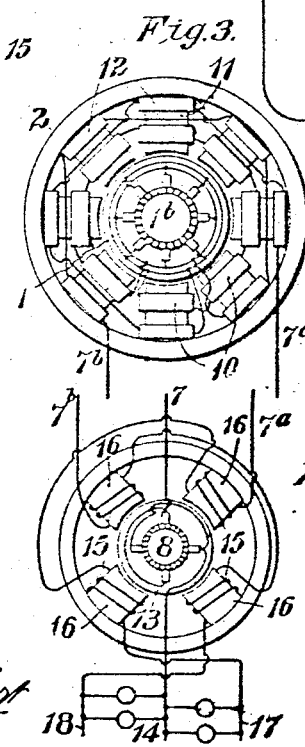

Figure 1 is a diagram of a system of distribution embodying a rotary converter and one form of my voltage-adjusting means. Fig. 2 is a similar diagram of a three-wire system embodying a direct-current generator having alternating-current connections to a transformer-winding and provided with another form of my voltage-adjusting means. Fig. 3 is a diagrammatic end elevation of the direct-current end of a generator or rotary converter employed in practicing my invention and showing the arrangement and connections of the series-field-magnet windings; and Fig. 4 is a view, similar to Fig. 3, of the regulating-generator shown in Fig. 1.

Figure 4:
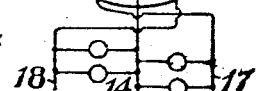

Referring now particularly to Figs. 1, 3, and 4, the winding of the armature 1 of the rotary converter 2 is connected, by means of collector-rings 3 and brushes 4, to the secondaries 5 of two transformers 6, it being understood that the primaries of these transformers are supplied with energy from a suitable source of two-phase currents, it being also understood that either current of a single phase or currents of a greater number of phases than two may be employed, if desired, polyphase currents being, however, preferable in order that the rotary converter may be more readily self-propelled. The middle points of the secondaries 5 of the transformers 6 are connected to one end of a conductor 7, the other end of such conductor being connected to one brush of the commutator 8 of the regulating-generator 9, which will be hereinafter more fully described. The rotary converter 2 is provided with a shunt-field-magnet winding 10, the coils of which may be disposed upon the pole-pieces 11 and connected in the usual manner to produce alternate positive and negative poles. One half of the coils of the series-field-magnet winding 12 are connected in series between the positive brushes of the commutator $1^b$ and the positive conductor $7^a$, and the other half of said coils are connected in series between the negative brushes and the negative conductor $7^b$, the arrangement of coils being such that those connected to the positive side of the system shall alternate in position, either singly or in groups, with those connected to the negative side. In case the number of poles is a multiple of four, each set of coils of the series winding may comprise a plurality of groups, the several coils of each group being connected together in series and the groups of the two sets being disposed and connected in circuit in the manner above described. With any other number of poles than that above indicated the series coils will be alternately disposed in two sets, which will be respectively connected in series between the brushes of one sign and the corresponding main conductor of the three-wire circuit. I arrange the coils symmetrically and connect alternate coils in series between the respective brushes and the corresponding main conductors in order that the overcompounding desired with an increase of load may be secured irrespective of the side of the three-wire circuit that receives the increase of load and also in order that a uniformly-distributed magnetic field may be insured.

In Fig. 3 I have shown the rotary converter 2 as provided with eight poles, the series coils of which are connected to form two sets of four coils each, the coils of each set being alternated in position with those of the other and connected in series between one set of brushes and the corresponding side of the main circuit. It will be understood, however, from what has already been stated that each set may comprise two pairs of coils instead of four single coils, as indicated.

As already indicated, the regulating-generator 9, which will preferably be a low-voltage machine, has its armature 13 connected between the neutral or balancing conductor 14 and the middle points of the secondaries 5 of the transformers 6 by means of the commutator 8 and conductor 7. The field-magnet windings 15 of this generator are so disposed upon the pole-pieces 16 that when the currents in the two main conductors 17 and 18 are equal the magnetizing effects will oppose each other, and consequently there will be no difference of potential between the brushes of the commutator 8. If, however, the load is increased on either side of the three-wire system, the increased current flowing through the corresponding field-magnet coils 15 will provide a magnetic flux that will overbalance that due to the current on the other side, and there will be a corresponding difference of potential between the brushes of the commutator 8.

Referring now to Fig. 2 of the drawings, the generator $2^a$ may be substantially the same in construction as the rotary converter 2, except that it must be provided with means whereby it may be mechanically driven from some source of power. The collector-rings $3^a$ and brushes $4^a$ serve to connect the armature $1^a$ to the terminals of an autotransformer $6^a$, this being shown as a three-wire transformer having a star arrangement of coils, though any other suitable form and arrangement of winding may be employed, if desired. The middle point of this transformer-winding $6^a$ is connected to the neutral conductor 14 of the three-wire circuit 17 14 18 by means of a conductor 7 and the commutator 8, armature 13, and field-magnet winding $15^a$ of a low-voltage regulating-generator $9^a$, the field-magnet winding being in series with that of the armature. In this arrangement the conductors 17 and 18 are continuations of the conductors $7^a$ and $7^b$ and have no connection with the machine $9^a$ except through the translating devices.

As in all three-wire systems, when the loads on the two sides of the system are equal the compensating or neutral conductor will carry no energy either to or from the windings 5 or $6^a$, as the case may be, and consequently there will be no difference of potential between the brushes of the commutator 8 of the machine 9. If, however, an additional load be added to one side of the system which requires an overcompounding on that side, the series-field-magnet windings 12 of the rotary converter 2 or of the generator $2^a$, as the case may be, will serve to overcompound sufficiently to provide all or a part of the increased voltage desired; but the increased voltage will be equally distributed between the two sides, provided no additional regulating means is employed.

Referring now to Figs. 1, 3, and 4 and assuming for purposes of illustration that the normal voltage between each of the main conductors and the neutral conductor is one hundred and ten volts and that a load is added to the positive side which requires a voltage of one hundred and fourteen volts, while the load on the other side remains unchanged, the machine 2 may be assumed to be so designated as to overcompound to provide one hundred and twelve volts on each side. Under these conditions the field-magnet winding 15 in series with the positive conductor 17 of the system will by reason of the additional load on that side have a greater current than the corresponding field-magnet winding of the negative side. There will therefore be a difference of potential across the brushes of the commutator 8 of substantially two volts. These two volts will therefore be added to the one hundred and twelve volts supplied to the positive side of the system by the rotary converter, thus providing the four volts of overcompounding required between the conductors 14 and 17. This operation also subtracts two volts from the one hundred and twelve volts on the negative side of the system, leaving the voltage between the conductors 14 and 18 at one hundred and ten, as it was originally and as it should be, because there has been no additional load placed upon that side. The addition of load to the negative side of the system would obviously be accompanied by a corresponding increase of voltage on that side in the manner above described.

The result secured by employing the apparatus shown in Fig. 2 is the same as that above set forth, as will be readily understood. When the loads on the two sides of the three-wire circuit are equal, there will obviously be no flow of energy through the machine 9$^a$; but an increase of load on either the positive or the negative side causes energy to flow through the conductor 14 in one direction or the other, according to the side that receives the additional load, and the regulating-machine accordingly compounds to provide the voltage desired for the side carrying the extra load. Each of the machines 9 and 9$^a$ is obviously adapted for use in connection with either the system shown in Fig. 1 or that shown in Fig. 2, and the relations in which these machines appear in the drawings are not intended to be indicative of special adaptation or preference.

I desire it to be understood that my invention is not limited to any specific construction or arrangement of machines and circuits except in so far as limitations are imposed by the state of the art or by such conditions of operation as have been particularly pointed out in connection with the constructions and arrangements upon which they exclusively depend.

I claim as my invention—

1. In a three-wire system of electrical distribution, the combination with a dynamo-electric machine having direct-current connections to the positive and negative wires of the system and alternating-current connections to a transformer-winding, of a regulating-generator having its armature connected in circuit between the middle point of said transformer-winding and the neutral or balancing conductor of the system and having field-magnet coils the magnetizing effect of which varies as the difference between the loads on the two sides of the circuit varies.

2. In a three-wire system of electrical distribution, the combination with a dynamo-electric machine having direct-current connections to the positive and negative wires of the system and alternating-current connections to a transformer-winding, of a regulating-generator having its armature connected in circuit between the middle point of said transformer-winding and the neutral or balancing conductor of the system and having field-magnet coils which have no magnetizing effect when the two sides of the circuit are equally loaded but which produce a field that corresponds in direction and amount to an extra load on either side of the circuit.

3. In a three-wire system of electrical distribution having its compensating conductor connected to the generator through a transformer-winding, a dynamo-electric voltage-regulator having its armature and field-magnet windings connected in circuit with the compensating conductor and serving to automatically adjust the voltage of either side of the circuit in accordance with changes of load thereon.

4. A three-wire system of electrical distribution comprising a compound-wound dynamo-electric machine having direct-current connections with the positive and negative conductors of the system and alternating-current connections through a transformer-winding with the neutral conductor of the system, in combination with a dynamo-electric voltage-regulator having windings which constitute parts of the distributing-circuit and serving to automatically adjust the voltage of either side independently of the other as may be required by variations in load.

5. A three-wire system of distribution comprising a compound-wound dynamo-electric machine having one half of its series-field-magnet winding symmetrically disposed around the armature and connected between one commutator-brush or set of brushes and the positive conductor of the system and having the other half of said winding symmetrically disposed and connected between the other brush or set of brushes and the negative conductor, in combination with a transformer-winding having its terminals connected to the armature-winding of said dynamo-electric machine and its middle point to the neutral conductor of the system, and a dynamo-electric regulator having windings which constitute parts of the distributing-circuit.

6. A three-wire system of distribution comprising a compound-wound dynamo-electric machine having one half of its series-field-magnet winding symmetrically disposed around the armature and connected between one commutator-brush or set of brushes and the positive conductor of the system and having the other half of said winding symmetrically disposed and connected between the other brush or set of brushes and the negative conductor, in combination with a transformer-winding having its terminals connected to the armature-winding of said dynamo-electric machine and its middle point to the neutral conductor of the system, and a dynamo-electric regulator having its armature and field-magnet windings interposed in the neutral conductor in series with each other.

In testimony whereof I have hereunto subscribed my name this 3d day of March, A. D. 1900.

CHARLES IRA YOUNG.

Witnesses:
  A. SAUNDERS MORRIS,
  ROBT. B. FLETCHER.